June 21, 1966     J. R. LAUBE     3,257,603
POWER SUPPLY EMPLOYING AN ACTIVE FILTER ELEMENT
Filed Nov. 19, 1962
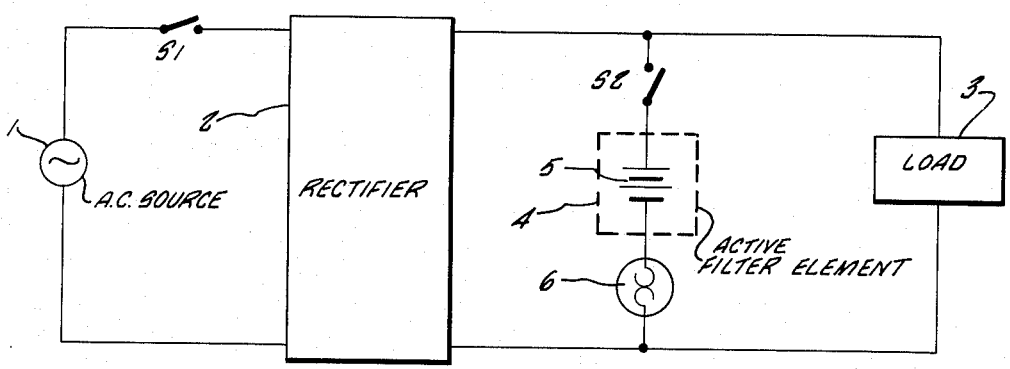
FIG_1_
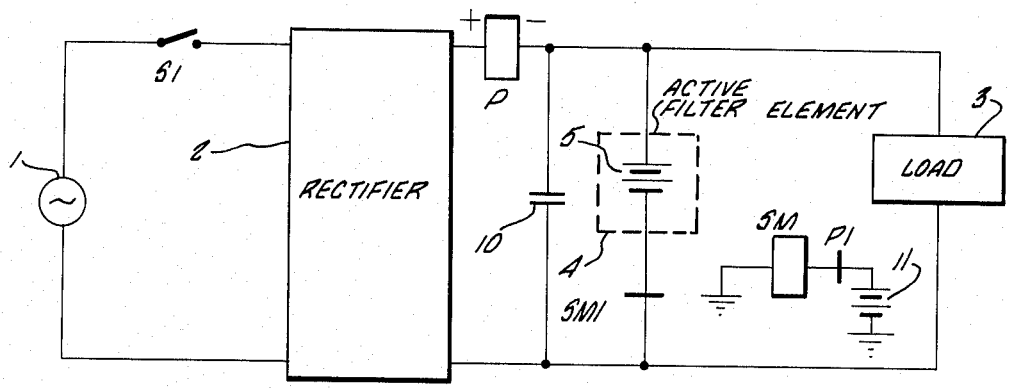
FIG_3_
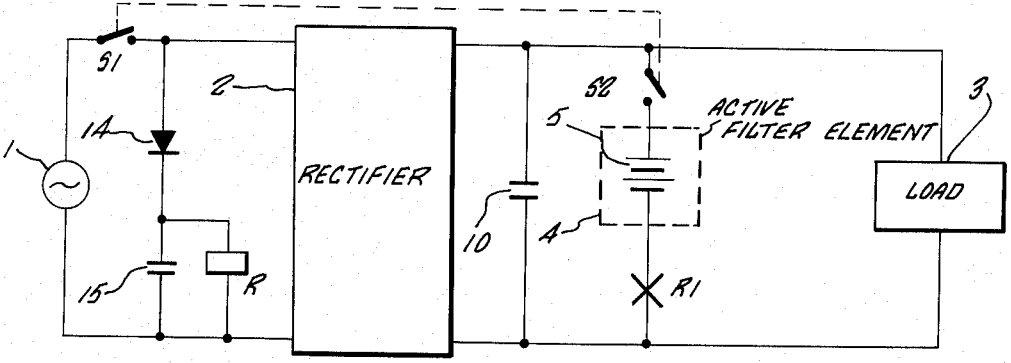
FIG_2_
INVENTOR.
JANUSZ R. LAUBE
BY
Christie, Parker & Hale
ATTORNEYS.

United States Patent Office 3,257,603
Patented June 21, 1966

3,257,603
POWER SUPPLY EMPLOYING AN ACTIVE
FILTER ELEMENT
Janusz Richard Laube, Rosemead, Calif., assignor to Burroughs Corporation, Detroit, Mich., a corporation of Michigan
Filed Nov. 19 1962, Ser. No. 238,606
3 Claims. (Cl. 321—10)

This invention relates to filtered power supplies and more particularly to power supplies employing compact, highly efficient, active filters with controlled duration of delivered energy to a load.

In the usual power supply where alternating current is converted to direct current there is employed a transformer for transforming the input voltage to the desired level, a rectifier for converting the input voltage to pulsating direct-current and a filter for smoothing the pulsating output voltage of the rectifier. The power supply may additionally contain circuits for regulation or stabilization, when required.

When a power supply is employed, for example, in the computer art, it is necessary that it supply a continuous non-fluctuating voltage in order to avoid the introduction of errors into the information being processed by the computer. The continuous non-fluctuating voltage will supply a continuous flow of current necessary for the proper operation of the computer, which performs a plurality of operations within a very short period of time. It is known that if there is a loss of power for even a small fraction of a second, many errors may be introduced into the information passing through the computer.

Therefore, it is seen that a power supply, which has a non-pulsating output, is of great importance. The circuitry which smoothes the output of the power supply and provides a non-pulsating output comprises the filtering elements, which are, in effect, energy storage devices. However, when the line voltage drops excessively or disappears completely for several cycles, the standard filter is not able to store enough energy to maintain the voltage level above the required minimum.

Even though it is possible to increase the storage capacity of the filter by using more filtering elements, such as electrolytic capacitors connected in parallel, the resultant disadvantages are numerous. For example, when a large amount of energy is required and parallel capacitors are employed, the space occupied by the capacitors and the expenses thereof become inordinate. Another solution commonly used is a motor-alternator set equipped with an adequate flywheel. Motor-alternator sets, however, are also expensive and large and noisy and normally require separate rooms and regular maintenance service.

Therefore, in accordance with the invention, an active element, such as a re-chargeable battery, is employed as the filtering element for smoothing the output of a rectifier circuit. Such a filter will be several times smaller in size and much less expensive than present filter capacitors of comparable capacity. The active filter will not only be an extremely effective filter, which occupies a minimal space, but will also supply full load current during short duration losses of primary power.

However, when a battery is used as an active filter, it is necessary to provide control circuits, so that, when there is a loss of primary power, the battery will not be left in the circuit for an extended period but will be removed before it is incapacitated by an excessive current drain.

Therefore, in accordance with the invention, a control circuit is provided which will insert and remove the active filter at the proper time in conjunction with the application and removal of the primary power source. The control circuit additionally provides for the removal of the active filter from across the load after a predetermined time with respect to an unanticipated loss of the primary power.

One form of control circuit includes a switch for connecting the active element in the filtering circuit. This switch operates in conjunction with the switch which applies the primary power to the power supply. The control circuit additionally includes a current sensitive device in series with the active filter to open the current path from the active element to the load after the active element has supplied current to the load for a predetermined period of time.

Alternative control circuits comprise a means responsive to the input voltage from the primary source for sensing the presence of the input voltage, and means responsive to the sensing means for controlling the presence across the load of the active filter.

The above and other features and advantages of the present invention will appear more clearly and fully upon consideration of the following specification and drawing in which:

FIG. 1 is a diagram, partially in schematic form, of a power supply including an active filter element and a simple control circuit, in accordance with the invention;

FIG. 2 is a diagram of a power supply showing a preferred embodiment of a control circuit for the active filter, in accordance with the invention; and FIG. 3 is a diagram of an alternative control circuit for the active filter element.

The power supply of FIG. 1 includes an alternating-current source 1 for supplying the primary power, a rectifier 2 for changing the alternating current to a pulsating direct-current and a load 3 for utilizing the direct-current output from rectifier 2. The filtering circuit, which smoothes the pulsating output of the rectifier, includes an active filter element 4, in accordance with the invention, which is connected in parallel with the load 3 across the output of the rectifier 2.

A typical operation of the power supply involves the closing of a switch S1 to supply the primary power to the rectifier 2 and a subsequent closing of a switch S2 to connect the active filter 4 into the circuit for the smoothing of the pulsating direct-current output. It is noted that switch S2 is closed after switch S1 which applies the primary power and is opened before switch S1 upon the removal of the primary power. This is done to prevent excessive current drain from the filtering element during the time that the primary source is removed.

Upon the connection of the active filter element 4 by the closing of switch S2, any subsequent decrease in the input voltage or unexpected loss of the primary power from source 1 will be compensated for by the active element. Thus, the direct-current voltage supplied to the load will be substantially non-fluctuating and continuous.

The active filter comprises a battery 5, which is primarily selected to provide the necessary filtering action and, consequently, has a specific capacity and will not supply full load current for an extended period of time.

Thus, it is necessary to provide a means for removing the active filter element from across the load before the battery is materially discharged while supplying the load current during a loss or decrease in the input voltage from source 1. Such a means is shown in FIG. 1 as a thermalswitch 6, which is connected in the conduction path of the active filter element 4. When the current flowing in the conduction path of the active filter element 4 through the thermalswitch 6 is greater than that normally flowing, the thermalswitch 6 will open the circuit after a preselected period of time. Once the thermalswitch has opened the circuit, it will be necessary to manually reset the switch so that the active filter element 4 will again be connected in the circuit.

It is desirable to provide a control circuit for the active filter element which will automatically place the element back into the circuit once the primary power source is restored to its normal operating condition. A preferred embodiment of such a control circuit is shown in FIG. 2. It is noted that the elements of FIG. 2, which are analogous to the elements of FIG. 1, have the same reference letters and numbers.

The control circuit for the active filter element 4 of FIG. 2 includes an auxiliary power supply connected directly across the primary source 1 through switch S1. Upon the closing of switch S1, a diode 14 will rectify the input voltage and a capacitor 15 will smooth this rectified voltage.

The conduction path of the active filter element 4 is directly controlled by a switch which is a make contact R1 that closes upon the energization of its associated relay. The make contact R1 is controlled by relay R which is connected directly across capacitor 15. Thus, the application of primary power to the power supply by the closing of switch S1 will cause the energization of relay R by the action of rectifier 14 and smoothing capacitor 15. The energization of relay R will close the make contact R1 to connect the active filter element 4 into the circuit.

It is noted that a second switch S2 is provided in the conduction path of the filter element 4. Switch S2 is mechanically connected to switch S1 and will be operated in conjunction therewith. This switch S2 is provided so that, upon the removal of the primary power source by the opening of switch S1, the active filter element 4 will not be left in the circuit but will also be removed.

It is seen that, even though switch S2 will be closed at the same time as switch S1, the active filter element 4 will not be immediately connected in the circuit. The connection of element 4 is also dependent upon the closing of switch R1 by the activation of relay R. Relay R will not be immediately activated when the primary power is applied through switch S1. This time lag is caused by the building up of sufficient voltage across capacitor 15 to activate relay R.

After the application of primary power, any subsequent unanticipated loss or decrease will be compensated for by the active filter element 4. However, the period of time, during which filter element 4 will supply the load current, will be determined by the capacity of capacitor 15 in conjunction with its series resistance in its discharge path. Therefore, by controlling the discharge time of capacitor 15, the time of de-energization of relay R and the removal of filter element 4 may be controlled. Additionally, when the primary source is restored to its normal operating condition, capacitor 15 will again be charged through diode 14 and will cause the reactivation of relay R so that the filter element 4 will be reconnected automatically.

The combination of the diode 14, capacitor 15, relay R and the relay's associated contact R1 is one of the circuits which may be employed to automatically control the presence of the active filter element in the power supply. Another advantageous circuit employs a polar relay to sense the presence of energy from the primary power source and a delayed action relay as a timing device for control of the active filter element's connection. Such a circuit is shown in FIG. 3.

The automatic control circuit of FIG. 3 includes a polar relay P connected to one output terminal of the rectifier 2. The polar relay P will sense the direction and magnitude of the output current from the rectifier 2. In place of a thermalswitch of FIG. 1 in the conduction path of the active filter element 4, there is provided a break contact SM1, which is normally closed when its associated relay is de-energized. The break contact SM1 is controlled by the action of relay SM which is connected in an auxiliary circuit provided for the automatic control of the filter element 4.

Additionally, in the auxiliary circuit there is provided a break contact P1 which is associated with the polar relay P. The break contact P1 is normally closed when the polar relay P is deenergized. The auxiliary circuit further comprises a source 11 for supplying the current for the energization of relay SM.

Upon the application of the primary power from source 1 by the closing of switch S1, the current supplied to the load 3 will be sensed by the polar relay P. The polar relay P will then become energized and will cause its break contact P1 to open. The opening of contact P1 will open the conduction path through relay SM to de-energize this relay. The de-energization of relay SM will cause its break contact SM1 in the conduction path of filter element 4 to close. Thus, it is seen that the filter element 4 will automatically be connected into the circuit after the closing of switch S1.

A subsequent loss of primary power will be sensed by polar relay P. If the loss is of sufficient duration and magnitude, relay P will become de-energized thus closing its contact P1. The closing of contact P1 will cause the energization of relay SM. Relay SM is selected to be a slow make relay having a selected time of energization determined by the capacity of the active filter element 4. The energization of relay SM will open its contact SM1 to remove the active filter element 4 from across the load. Therefore, there will be an automatic removal of the element 4 after a preselected period of time upon the loss of primary power.

When the primary source is restored to its normal operating condition, it will again supply the current to the load through the polar relay P. This reactivation of the primary source will be sensed by the relay P which will become energized. The energization of relay P will cause the de-energization of relay SM so that the active filter element 4 will be reconnected in the circuit.

An additional element is included in the power supply of FIG. 3. This is capacitor 10, which is provided to prevent excessive fluctuations in the output voltage of the rectifier 2 before the application of the active filter element 4.

What is claimed is:

1. A power supply comprising an alternating-current source, a first rectifier circuit, a direct-current load, means for connecting the direct-current load across the output of the first rectifier, an active filter element, a second rectifier, a filter element connected in series with the second rectifier to form a series combination, means for connecting the series combination in parallel with the first rectifier across the output of the alternating-current source, means connected across the filter element of the series combination to sense the presence of energy from the alternating-current source, means connected in series with the active filter element to control the current conduction path through the active filter element, the control means being responsive to the energy sensing means, and means for connecting the series circuit of the control means and the filter element in parallel with the load.

2. A power supply in accordance with claim 1, including a first switch connected between the alternating-current source and the parallel combination of the first rectifier circuit and the series combination.

3. A power supply in accordance with claim 2, including a second switch mechanically coupled to the first switch and connected in series with the control means and the active filter element to close the conduction path through the active filter element upon the application of energy from the alternating current source by the closing of the first switch and to open the current conduction path through the active filter element upon the removal of the energy from the alternating current source by the opening of the first switch.

References Cited by the Examiner
UNITED STATES PATENTS

| | | | |
|---|---|---|---|
| 1,745,608 | 2/1930 | Donle | 321—10 |
| 1,878,101 | 9/1932 | Bradbury | 321—10 |
| 1,930,165 | 10/1933 | Gage | 333—79 |
| 2,539,015 | 1/1951 | Gelzer | 333—79 |
| 2,997,631 | 8/1961 | Moakler | 307—64 |
| 3,108,191 | 10/1963 | Bagno | 307—66 |

LLOYD McCOLLUM, *Primary Examiner.*

L. R. CASSETT, T. J. MADDEN, *Assistant Examiners.*